United States Patent

[11] 3,626,058

[72] Inventor Robert J. Balske
    Creve Coeur, Mo.
[21] Appl. No. 17,905
[22] Filed Mar. 9, 1970
[45] Patented Dec. 7, 1971
[73] Assignee Monsanto Company
    St. Louis, Mo.

[54] ANTHELMINTIC USE OF 4-PHENYLAZOPHENYLISOTHIOCYANATE
    5 Claims, No Drawings

[52] U.S. Cl. ........................................ 424/226
[51] Int. Cl. ........................................ A61k 27/00
[50] Field of Search .......................... 424/226, 302

[56] References Cited
    UNITED STATES PATENTS
3,073,738  1/1963  Hopkins et al. ............... 424/226
    OTHER REFERENCES
Chemical Abstracts, Vol. 17, 1923, p. 3863

Primary Examiner—Sam Rosen
Assistant Examiner—Vincent D. Turner
Attorneys—Neal E. Willis, Paul C. Krizov and Albert J. Greene ABSTRACT: Usage of 4-phenylazophenylisothiocyanate in combating helminthiasis in animals, particularly ruminants and the monogastric animals.

ANTHELMINTIC USE OF 4-PHENYLAZOPHENYLISOTHIOCYANATE

This invention relates to the anthelmintic usage of 4-phenylazophenylisothiocyanate (or azobenzene-4-isothiocyanate)

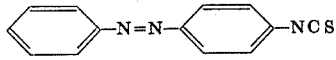

a solid, which is prepared in accordance with the procedure in J.A.C.S., Vol. 45, p. 2355 Oct., 1923) from thiophosgene and 4-amino-azobenzene (or 4-phenylazoaniline).

The compound of this invention is useful in combating helminthiasis in animals susceptible to or suffering from an infestation in their gastrointestinal tract with parasitic worms of the phyla Nemathelminthes and Platyhelminthes, the member species of which phyla are generically termed helminths. Parasitic worms of the phylum *Platyhelminthes* which infest the digestive systems of animals include tapeworm species of the class *Cestoidea* and fluke species of the class *Trematoda*, which parasitic worms are often termed flatworms, a particularly injurious helminth species being *Taenia saginata*. Parasitic worms of the phylum *Nemathelminthes* which infest the digestive systems of animals include round worms of the class *Nematoda*, particularly such species as *Ascaris suum*, *Syphacea obvelata* and the economically important *Haemonchus contortus* of ruminants. This invention is particularly concerned with combating this latter helminth species amongst others of the phylum *Nemathelminthes* in ruminant and monogastric animals.

The term "animal" as employed herein and in the appended claims includes, for example, the ruminants such as deer, goats, sheep and cattle, the monogastrics such as swine, rabbits, dogs, cats, and hamsters, poultry such as chickens, turkeys, geese, ducks, guinea fowl, pigeons and pheasants and birds such as parrots, canaries, parakeets, and the like, which are susceptible to helminthiasis.

The method of combating helminthiasis in an animal in accordance with this invention involves contacting the helminth in the body of the animal by administering thereto an anthelmintically effective amount of 4-phenylazophenylisothiocyanate aforedescribed. This new anthelmintic is somewhat soluble in organic solvents and is readily adapted to be administered to animals. The compound can be employed in admixture with grain rations or animal feeds. It can be administered continuously or intermittently in dosages sufficient to protect the animal from the attack of helminthes without in any way causing detriment to the animal.

The administration or feeding of an effective dosage of the compound of this invention to be employed according to the present invention is essential and critical for the practice of this invention. The amount thereof which will constitute an effective anthelmintic dosage varies considerably and is dependent upon such factors as the animal concerned, the age of the animal, the helminth against which protection is sought, the life state of such organism against which protection is sought and the like. In general, good results are obtained when there is administered to animal a dosage of from 0.01 to 1,000 milligrams of the compound per kilogram of body weight and preferably from 0.01 to 500 milligrams per kilogram of body weight. Where the compound of this invention is administered on a daily schedule, good results are obtained when employing daily dosages of from 0.01 to 150 milligrams of the compound per kilogram of animal body weight. Where helminth control is the main objective of treatment and the danger of reexposure to the attack of intestinal parasites from contaminated feed or surroundings is low, good results are obtained when there is administered to an animal a daily dosage of from 0.5 to 50 milligrams or more per kilogram of body weight. Where such danger of reexposure is very low, good results are frequently obtained when an animal is dosed on a single occasion with from 2.5 to 1,000 milligrams of the compound of this invention per kilogram of body weight.

The method of the present invention can be carried out by administration or feeding of the compound per se of this invention. However, the present invention embraces the employment of any liquid, powder, mash, drench, bolus, pellet, capsule or other animal food containing this new anthelmintic compound. In such usage, the compound of this invention can be modified with one or more of a plurality of additaments or innocuous ingestible adjuvants including water, ethanol, skim milk, edible oils, propylene glycol, syrups grain rations, surface active dispersing agents such as the liquid and solid emulsifying agents, and edible solid carriers such as edible powders and commercial animal feeds, concentrates or supplements. By "commercial animal feeds, concentrates or supplements" are meant the partial and complete animal feeds containing desirable amounts of minerals, vitamins, antioxidants, antibiotics and growth stimulants. In such animal feed compositions, the adjuvant cooperates with the active agent so as to facilitate the invention and obtain an improved result. Further, the compositions are adapted to be fed to animals to supply the desired dosage of active agent, or to be employed as concentrates and subsequently diluted with additional carrier or adjuvant to produce the ultimate compositions.

The active material of this invention can also be dispersed, with or without vitamin, mineral, or other feed supplements, upon a material, such as spaghnum moss, which serves as an edible mechanical support or roughage. The resulting treated material is employed as, or in addition to other, animal feed, or supplied to young nursing animals not yet feeding on the feed ration normally fed to the adult animals.

The exact concentration of the compound of this invention to be employed in the compositions can vary provided that enough of the composition is ingested by the animal so as to provide the required internal anthelmintic amount of active ingredient. For examples, where direct administration to the individual animal is preferred, liquid or solid compositions containing from 0.5 to 98 percent by weight of the compound of this invention conveniently are employed to supply the desired dosage. Representative of this type of composition is the relatively concentrated composition containing the active agent of this invention and nutritive supplementary materials, which composition is provided for the adlibitum consumption by animals, that is a "salt-block" type of composition. Also representative of such compositions is a slow-release type of composition containing the compound of this invention in the form of small pellets or granules which are administered orally and which lodge internally and release their contents over an extended period of time. Where the compound of this invention is provided as a constituent of the principal food or water ration, satisfactory results are obtained with rations containing a minor but effective amount of the new anthelmintic compound. The exact amount of the compound in the ration or drinking water is dependent upon the food and water consumption and feeding and watering habits of the animals concerned. In animal feeds, the required dosage can be supplied with feeds containing at least 0.0001 percent or more and usually from 0.0001 to 0.5 percent by weight of active material. When fed as the principal food ration, the required dosage is conveniently supplied with feeds containing from 0.0001 to 0.3 percent by weight of active material.

As illustrative of this invention but not limitative thereof is the following:

The anthelmintic activity of 4-phenylazophenylisothiocyanate is illustrated by the following method in which the reduction in fecal egg count was used as the criteria for reduction of the parasite burden. Three male sheep were equally infested with larvae of *Haemonchus contortus*. The sheep faeces were examined at intervals for eggs of *Haemonchus contortus* to insure that infestation had occurred. Approximately (36) days after this infestation two of these sheep were respectively dosed with 4-phenylazophenylisothiocyanate at a rate of 100 mg. per kg. of body weight. The third untreated sheep served as a control to confirm that *Haemonchus contortus* eggs were continually produced throughout the evaluation period. Reduction in fecal eggs was determined by counting the number of eggs per gram of sheep faeces passed six days immediately following said dosing and then comparing the average number of eggs per gram of faeces passed from the two treated sheep to the average number of eggs per gram of faeces said two sheep passed on the day of their dosing. The average reduction in egg count from the two treated sheep was 100 percent.

The compound of this invention is also highly effective in combating species of the respective genera *Trichostrongylus*, *Ostertagia* and *Nematodiris*.

While this invention has been described with respect to certain embodiments it is to be understood that it is not so limited and that variations and modification thereof obvious to those skilled in the art can be made without departing from the spirit or scope of this invention.

What is claimed is:
1. A method of combating helminthiasis in an animal which comprises contacting the helminth in the body of the animal by orally administering thereto an anthelmintically effective amount of 4-phenylazophenylisothiocyanate.
2. A method in accordance with claim 1 wherein the animal is a ruminant animal.
3. A method in accordance with claim 1 wherein the animal is a monogastric animal.
4. A method in accordance with claim 1 wherein the helminth combated is a species of the phylum *Nemathelminthes*.
5. A method in accordance with claim 4 wherein the helminth combated is the species *Haemonchus contortus*.

* * * * *